United States Patent
Li (10) Patent No.: US 11,151,777 B2
(45) Date of Patent: Oct. 19, 2021

(54) NON-MAXIMUM SUPPRESSION OPERATION DEVICE AND SYSTEM

(71) Applicant: Shanghai Xiaoyi Technology Co., Ltd., Shanghai (CN)

(72) Inventor: Dawen Li, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 167 days.

(21) Appl. No.: 16/364,735

(22) Filed: Mar. 26, 2019

(65) Prior Publication Data
US 2019/0304171 A1 Oct. 3, 2019

(30) Foreign Application Priority Data
Mar. 27, 2018 (CN) .......................... 201810257947.9

(51) Int. Cl.
*G06T 15/30* (2011.01)
*G06F 9/38* (2018.01)
*G06F 17/16* (2006.01)

(52) U.S. Cl.
CPC ............ *G06T 15/30* (2013.01); *G06F 9/3877* (2013.01); *G06F 17/16* (2013.01); *G06T 2210/12* (2013.01)

(58) Field of Classification Search
CPC .. G06T 2210/12; G06T 7/00–97; G06F 7/026
See application file for complete search history.

(56) References Cited

U.S. PATENT DOCUMENTS

| | | | |
|---|---|---|---|
| 10,198,671 B1* | 2/2019 | Yang | G06T 7/11 |
| 10,249,049 B1* | 4/2019 | Rapaport | G06T 7/70 |
| 10,366,301 B1* | 7/2019 | Linzer | G06K 9/4642 |
| 10,860,837 B2* | 12/2020 | Ranjan | G06K 9/00281 |
| 2012/0148093 A1* | 6/2012 | Sharma | G06T 7/194 |
| | | | 382/103 |

(Continued)

FOREIGN PATENT DOCUMENTS

CN 106503748 A 3/2017

OTHER PUBLICATIONS

Rosebeck A. in "Intersection over Union (IoU) for object detection", Nov. 2016. Retrieved on [Nov. 3, 2020]. Retrieved from the Internet <https://www.pyimagesearch.com/2016/11/07/intersection-over-union-iou-for-object-detection/> (Year: 2016).*

(Continued)

*Primary Examiner* — Aimee Li
*Assistant Examiner* — Carlo Waje
(74) *Attorney, Agent, or Firm* — Cantor Colburn LLP (57) ABSTRACT

A non-maximum suppression operation device and system; the non-maximum suppression operation device includes: a data access module to import external data or export a non-maximum suppression computation result of the external data; a control module to send a control signal for performing a computation on the external data; and an operation module to perform an intersection-over-union computation on the external data on the basis of the control signal to obtain an intersection-over-union computation result, and to compare the intersection-over-union computation result with a preset threshold value to obtain the non-maximum suppression computation result.

8 Claims, 5 Drawing Sheets

(56) References Cited

U.S. PATENT DOCUMENTS

| | | | | |
|---|---|---|---|---|
| 2016/0155011 | A1* | 6/2016 | Sulc | G06K 9/00671 |
| | | | | 382/103 |
| 2018/0032840 | A1* | 2/2018 | Yu | G06T 7/11 |
| 2019/0171912 | A1* | 6/2019 | Vallespi-Gonzalez | |
| | | | | G06T 15/08 |
| 2019/0213406 | A1* | 7/2019 | Porikli | G06T 7/11 |
| 2019/0325263 | A1* | 10/2019 | Kellerman | G06K 9/4609 |
| 2020/0194108 | A1* | 6/2020 | Podilchuk | A61B 8/5223 |

OTHER PUBLICATIONS

Rosebeck A. in "Non-Maximum Suppression for Object Detection in Python", Nov. 2014. Retrieved on [Nov. 3, 2020]. Retrieved from the Internet <https://www.pyimagesearch.com/2014/11/17/non-maximum-suppression-object-detection-python/> (Year: 2014).*

F. Liang, S. Yang, T. Mai and Y. Yang, "The Design of Objects Bounding Boxes Non-Maximum Suppression and Visualization Module Based on FPGA," 2018 IEEE 23rd International Conference on Digital Signal Processing (DSP), Shanghai, China, 2018, pp. 1-5, doi: 10.1109/ICDSP.2018.8631668. (Year: 2018).*

Introduction to C and Computer Organization Lecture Notes. Retrieved on [Nov. 2, 2020]. Retrieved from the Internet <https://sites.google.com/site/arch1utep/home/course_outline/relational-operators-and-subtraction-order> (Year: 2016).*

Dumas J. D. on Computer Architecture Fundamentals and Principles of Computer Design, Second Edition, Nov. 25, 2016. https://doi.org/10.4324/9781315367118 (Year: 2016).*

CNIPA Office Action for corresponding CN Application No. 201810257947.9, dated Jun. 11, 2020.

Zhang Qiang et al., "A simplified non-maximum suppression with improved constraints", Journal of University of Science and Technology of China, Jan. 2016, vol. 46, No. 1., pp. 1-6. (With English Abstract).

* cited by examiner

NON-MAXIMUM SUPPRESSION OPERATION DEVICE AND SYSTEM

CROSS-REFERENCE TO RELATED APPLICATION

The disclosure claims the benefits of priority to Chinese Application No. 201810257947.9, filed on Mar. 27, 2018, which is incorporated herein by reference in its entirety.

FIELD OF TECHNOLOGY

The present disclosure relates to the field of target detection, and more particularly to a non-maximum suppression operation device and system.

BACKGROUND OF THE DISCLOSURE

In currently available technology, non-maximum suppression (NMS) is an important aspect of a target detection process. In NMS, first, bounding boxes (e.g. rectangular boxes) and a score for each bounding box are produced on the basis of a target detection model, then the highest scoring bounding box is selected to be an original bounding box and other bounding boxes that clearly overlap the original bounding box are suppressed. The detection method is continuously and recursively applied to other bounding boxes until finally the most representative bounding box is selected.

NMS computations may be completed using a central processing unit (CPU) or graphics processing unit (GPU). However, a CPU and/or a GPU are not devices for realizing NMS computations only. Completing NMS computations using a CPU or a GPU requires consuming a comparatively large amount of resources and power, making it difficult to meet requirements for a low-power design.

BRIEF SUMMARY OF THE DISCLOSURE

In order to address the aforementioned technical problem, an exemplary embodiment of the present disclosure provides a non-maximum suppression operation device, said non-maximum suppression operation device including: a data access module adapted to import external data or export a non-maximum suppression computation result of said external data, a control module adapted to send a control signal for performing computation on said external data, and an operation module adapted to perform an intersection-over-union computation on the external data on the basis of the control signal to obtain an intersection-over-union computation result, and to compare the intersection-over-union computation result with a preset threshold value to obtain the non-maximum suppression computation result.

In some embodiments, the operation module includes an operation submodule configured to perform an intersection-over-union computation on the external data to obtain the intersection-over-union computation result, and a threshold judgment submodule configured to compare the intersection-over-union computation result with the preset threshold value to obtain the non-maximum suppression computation result.

In some embodiments, the operation module further includes an intermediate value buffer submodule configured to cache intermediate value data of the operation submodule during the computation process.

In some embodiments, the external data includes coordinate information for a first bounding box and coordinate information for a second bounding box, and the operation submodule includes: an intersection computation unit configured to compute an intersection of the first bounding box and the second bounding box according to the coordinate information for the first bounding box and the second bounding box, a union computation unit configured to compute a union of the first bounding box and the second bounding box according to the coordinate information for the first bounding box and the second bounding box, and a division computation unit configured to compute a quotient of the intersection and the union to obtain the intersection-over-union computation result.

In some embodiments, the union computation unit includes: a sum computation subunit configured to compute a sum of the first bounding box and the second bounding box according to the coordinate information for the first bounding box and the second bounding box, and a first subtraction component configured to subtract the intersection of the first bounding box and the second bounding box from the sum of the first bounding box and the second bounding box to obtain the union of the first bounding box and the second bounding box.

In some embodiments, the coordinate information for the first bounding box is $(ax1, ay1)$ and $(ax2, ay2)$, the coordinate information for the second bounding box is $(bx1, by1)$ and $(bx2, by2)$, and the sum computation subunit includes: a second subtraction component configured to compute a difference between $ax1$ and $ax2$ to obtain a first coordinate difference, a third subtraction component configured to compute a difference between $ay1$ and $ay2$ to obtain a second coordinate difference, a first multiplication component configured to compute a product of the first coordinate difference and the second coordinate difference, a fourth subtraction component configured to compute a difference between $bx1$ and $bx2$ to obtain a third coordinate difference, a fifth subtraction component configured to compute the difference between $by1$ and $by2$ to obtain a fourth coordinate difference, a second multiplication component configured to compute a product of the third coordinate difference and the fourth coordinate difference; and an addition component configured to compute a sum of output results of the first multiplication component and the second multiplication component.

In some embodiments, the coordinate information for the first bounding box is $(ax1, ay1)$ and $(ax2, ay2)$, the coordinate information for the second bounding box is $(bx1, by1)$ and $(bx2, by2)$, and the intersection computation unit includes: a first maximum value comparison component configured to determine a maximum value among $ax1$ and $bx1$ to be a first horizontal coordinate, a first minimum value comparison component configured to determine a minimum value among $ax2$ and $bx2$ to be a second horizontal coordinate; a sixth subtraction component configured to compute a difference between the first horizontal coordinate and the second horizontal coordinate, a second maximum value comparison component configured to determine a maximum value among the output result of the sixth subtraction component and 0, a third maximum value comparison component configured to determine a maximum value among $ay1$ and $by1$ to be a first vertical coordinate, a second minimum value comparison component configured to determine a minimum value among $ay2$ and $by2$ to be a second vertical coordinate, a seventh subtraction component configured to compute a difference between the first vertical coordinate and the second vertical coordinate, a fourth maximum value comparison component configured to determine a maximum value among the output result of the seventh subtraction component and 0, and a third multiplication component configured to compute a product of output results of the second maximum value comparison component and the fourth maximum value comparison component to obtain the intersection of the first bounding box and the second bounding box.

In some embodiments, the threshold judgment submodule includes: an eighth subtraction component configured to compute a difference between the intersection-over-union computation result and the preset threshold value, and a fifth maximum value comparison component configured to determine a maximum value among the output result of the eighth subtraction component and 0 to obtain the non-maximum suppression computation result.

In some embodiments, the non-maximum suppression operation device further includes: a labeling module configured to label the external data according to the non-maximum suppression computation result.

In order to address the aforementioned technical problem, an exemplary embodiment of the present disclosure further provides a non-maximum suppression operation system, the non-maximum suppression operation system including the aforementioned non-maximum suppression operation device and a processor coupled to such device, wherein under the control of the processor, the non-maximum suppression operation device imports the external data.

In some embodiments, the non-maximum suppression operation device exports the non-maximum suppression computation result of the external data to the processor.

In comparison with currently available technology, the technical solution provided by exemplary embodiments of the present disclosure has at least the following benefits.

An exemplary embodiment of the present disclosure provides a non-maximum suppression operation device, the non-maximum suppression operation device including: a data access module configured to import external data or export a non-maximum suppression computation result of the external data; a control module configured to send a control signal for performing computation on the external data; and an operation module configured to perform an intersection-over-union computation on the external data on the basis of the control signal to obtain an intersection-over-union computation result, and to compare the intersection-over-union computation result with a preset threshold value to obtain the non-maximum suppression computation result. A dedicated hardware device for computing non-maximum suppression may be provided by the technical solution provided by the present disclosure. In comparison with existing solutions that employ a common processor (e.g., a central processing unit or a graphics processing unit) to implement a non-maximum suppression computation, an exemplary embodiment of the present disclosure may rapidly and efficiently complete an NMS computation while minimizing power consumption to the greatest extent. That is, when computational capacity is equal, this exemplary embodiment of the present disclosure consumes less power to compute non-maximum suppression; when power consumption is equal, the computational capacity of the dedicated hardware device provided by this exemplary embodiment of the present disclosure is greater.

Further, an exemplary embodiment of the present disclosure further provides a non-maximum suppression operation system, the non-maximum suppression operation system including the aforementioned non-maximum suppression operation device and a processor coupled to such device; under the control of the processor, the non-maximum suppression operation device imports the external data. The exemplary embodiments of the present disclosure may couple the non-maximum suppression operation device with a processor for the purposes of division of work and cooperation, thus saving such processor's resources while at the same time accelerating the non-maximum suppression computation process to allow better performance of the processor.

It is to be understood that both the foregoing general description and the following detailed description are exemplary and explanatory only and are not restrictive of the disclosed embodiments, as claimed.

DETAILED DESCRIPTION OF THE DISCLOSURE

Persons having ordinary skill in the art understand that, as stated in the Background of the Disclosure section, currently non-maximum suppression (NMS) computations are completed using a processor. Such computations require a substantial amount of the processor's resources to be engaged and a high rate of power consumption for processing and may therefore be unable to meet the requirements for a low-power design.

The technical problem addressed by the present disclosure is how to rapidly and efficiently complete an NMS computation while minimizing power consumption to the greatest extent to meet requirements for low-power designs of devices.

An exemplary embodiment of the present disclosure provides a non-maximum suppression operation device, the non-maximum suppression operation device including: a data access module configured to import external data or export a non-maximum suppression computation result of the external data; a control module configured to send a control signal for performing computation on the external data; and an operation module configured to perform an intersection-over-union computation on the external data on the basis of the control signal to obtain an intersection-over-union computation result, and to compare the intersection-over-union computation result with a preset threshold value to obtain the non-maximum suppression computation result. A dedicated hardware device for computing non-maximum suppression may be provided by the technical solution provided by the present disclosure. In comparison with existing solutions that employ a processor (e.g., a central processing unit or a graphics processing unit) to implement a non-maximum suppression computation, an exemplary embodiment of the present disclosure may rapidly and efficiently complete an NMS computation while minimizing power consumption to the greatest extent. That is, in comparison with the existing solutions, when computational capacity is equal, the exemplary embodiment of the present disclosure consumes less power to compute non-maximum suppression; when power consumption is equal, the computational capacity of the dedicated hardware device provided by the exemplary embodiment of the present disclosure is greater.

In order to make the aforementioned purposes, characteristics, and benefits of the present disclosure more evident and easier to understand, detailed descriptions of exemplary embodiments of the present disclosure are provided below with reference to the drawings attached.

Figure 1:
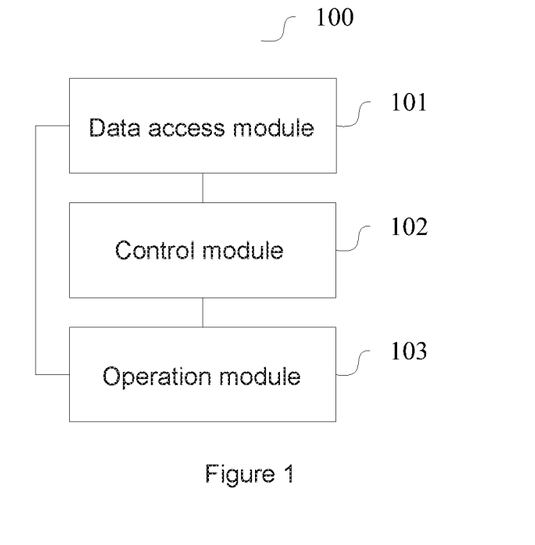
FIG. 1 is a block diagram illustrating a non-maximum suppression operation device in an exemplary embodiment of the present disclosure.

FIG. 1 is a block diagram illustrating a non-maximum suppression operation device 100 in an exemplary embodiment of the present disclosure. Referring to FIG. 1, the non-maximum suppression operation device 100 includes the following modules: a data access module 101, a control module 102, and an operation module 103.

In a specific embodiment, the data access module 101 connects to the control module 102 and the operation module 103. The data access module 101 may import external data from system memory (e.g., dynamic random access memory (DRAM)) and write such external data to a data storage device of the operation module 103. The data access module 101 may further import to system memory a NMS computation result from the data storage device of the operation module 103.

Further, the control module 102 may send a control signal for performing computation on the external data and, on the basis of the control signal, the control module 102 may control the operation process of the operation module 103. Specifically, the control module 102 may generate address information for the external data, and such address information is used for reading the external data by the operation module 103. When the control signal notifies the operation module 103 to perform an NMS computation, the operation module 103 may obtain the external data by using the address information.

Further, after receiving the control signal sent by the control module 102, the operation module 103 may immediately obtain the external data by using the address information and perform an intersection-over-union (IoU) computation on the external data. After an intersection-over-union computation result is obtained, the intersection-over-union computation result is compared with a preset threshold value, so that the non-maximum suppression computation result is obtained.

In a non-limiting exemplary embodiment, the external data is used to complete an NMS operation. Such external data may include coordinate information for two or more than two bounding boxes (e.g., rectangular boxes). The coordinate information for each bounding box may be the coordinates of the two endpoints of the diagonal of such bounding box.

Further, the non-maximum suppression operation device 100 may further include a labeling module (not shown in the figure) that labels the external data according to the non-maximum suppression computation result. When the external data is bounding box information (e.g., coordinate information for a bounding box), the IoU computation result is the overlap rate of a highest scoring original bounding box and another target bounding box. The NMS computation result may determine whether to label the target bounding box according to the result of the comparison between the IoU computation result and the preset threshold value.

When the target bounding box and the original bounding box significantly overlap (e.g., the IoU computation result is greater than the preset threshold value), the non-maximum suppression operation device 100 may label the target bounding box as a box to be discarded; or, when the target bounding box and the original bounding box do not significantly overlap, the non-maximum suppression operation device 100 may label the target bounding box as a box to be kept.

Here, the preset threshold value is a numerical value that is set in advance according to the requirements of an IoU algorithm. Under normal circumstances, the preset threshold value may be set to be between 50% and 80% of the IoU computation result, or it may also be adjusted according to the actual requirements of the IoU algorithm.

Figure 2:
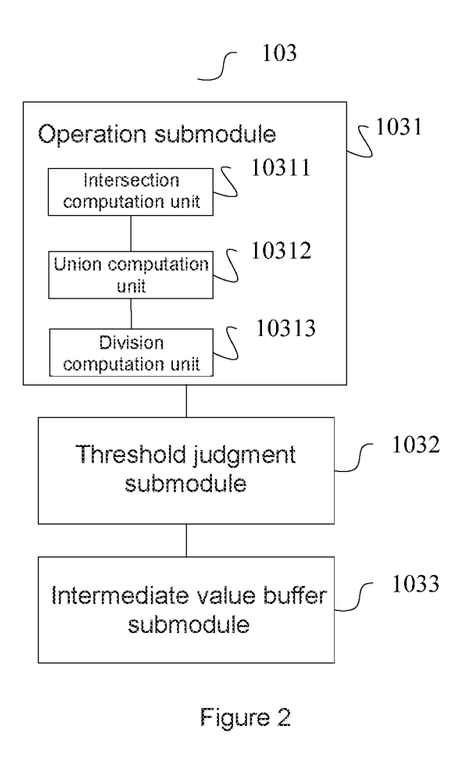
FIG. 2 is a block diagram illustrating an operation module in FIG. 1.

FIG. 2 is a block diagram illustrating an exemplary embodiment of the operation module 103. Referring to FIG. 2, the exemplary operation module 103 includes an operation submodule 1031 and a threshold judgment submodule 1032.

Specifically, the operation submodule 1031 may perform an intersection-over-union computation on the external data to obtain the intersection-over-union computation result. Specifically, the operation submodule 1031 includes an intersection computation unit 10311, a union computation unit 10312, and a division computation unit 10313.

Figure 3:
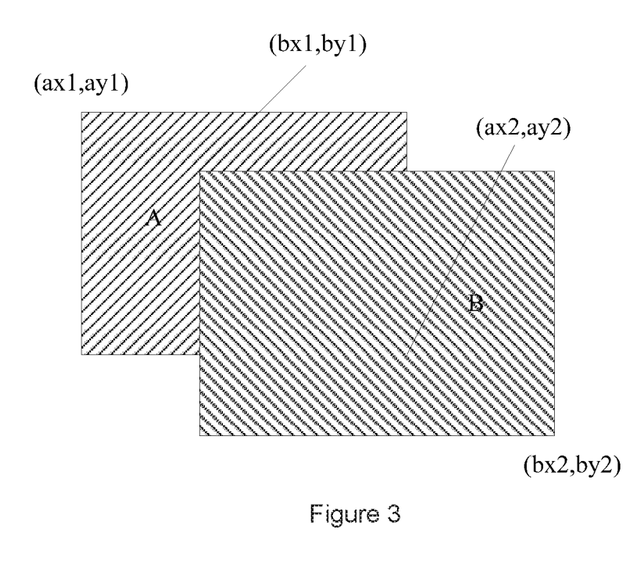
FIG. 3 is a block diagram illustrating an intersection and union of two bounding boxes.

As a non-limiting exemplary embodiment, referring to FIG. 3, "A" represents an original bounding box, "B" represents a target bounding box, the coordinates of the original bounding box A are (ax1, ay1) and (ax2, ay2), and the coordinates of the target bounding box B are (bx1, by1) and (bx2, by2). The intersection computation unit 10311 computes the intersection of the target bounding box B and the original bounding box A. The union computation unit 10312 computes the union of the target bounding box B and the original bounding box A. The division computation unit 10313 may compute the quotient of the intersection and the union (i.e., the IoU computation result).

Then, the non-maximum suppression operation device 100 compares the intersection-over-union computation result with the preset threshold value on the basis of the threshold judgment submodule 1032 to obtain the non-maximum suppression computation result. When the IoU computation result is greater than the preset threshold value, the target bounding box B may be labeled as one to be discarded; or, when the IoU computation result is less than or equal to the preset threshold value, the target bounding box B may be labeled as one to be kept or not labeled, and the operation is ended.

Further, the operation module 103 may further include an intermediate value buffer submodule 1033. The intermediate value buffer submodule 1033 caches intermediate value data of the operation submodule 1031 during the computation process. The intermediate value data may be a portion of or all of the intermediate values generated during the IoU computation. For example, the intermediate value data may be the computed intersection (i.e., A∩B) of the original bounding box A and the target bounding box B and/or the computed union (i.e., A∪B) of the original bounding box A and the target bounding box B, or the intermediate value data may be other values.

Specifically, pseudocode for the process of the IoU operation on the original bounding box A and the target bounding box B is as follows:

$as=(ax2-ax1)*(ay2-ay1);$ $bs=(bx2-bx1)*(by2-by1);$ $x1=\max(ax1,bx1);$ $y1=\max(ay1,by1);$ $$x2=\min(ax2, bx2);$$

$$y2=\min(ay2, by2);$$

$$w=\max(0, x2-x1);$$

$$h=\max(0, y2-y1);$$

$$A \cap B = w*h;$$

$$A \cup B = as+bs-w*h;$$

$$IOU = (A \cap B)/(A \cup B).$$

Here, as, bs, x1, y1, x2, y2, w, h, A∩B, A∪B, etc., may all be cached in the intermediate value buffer submodule 1033 as intermediate value data.

Figure 4:
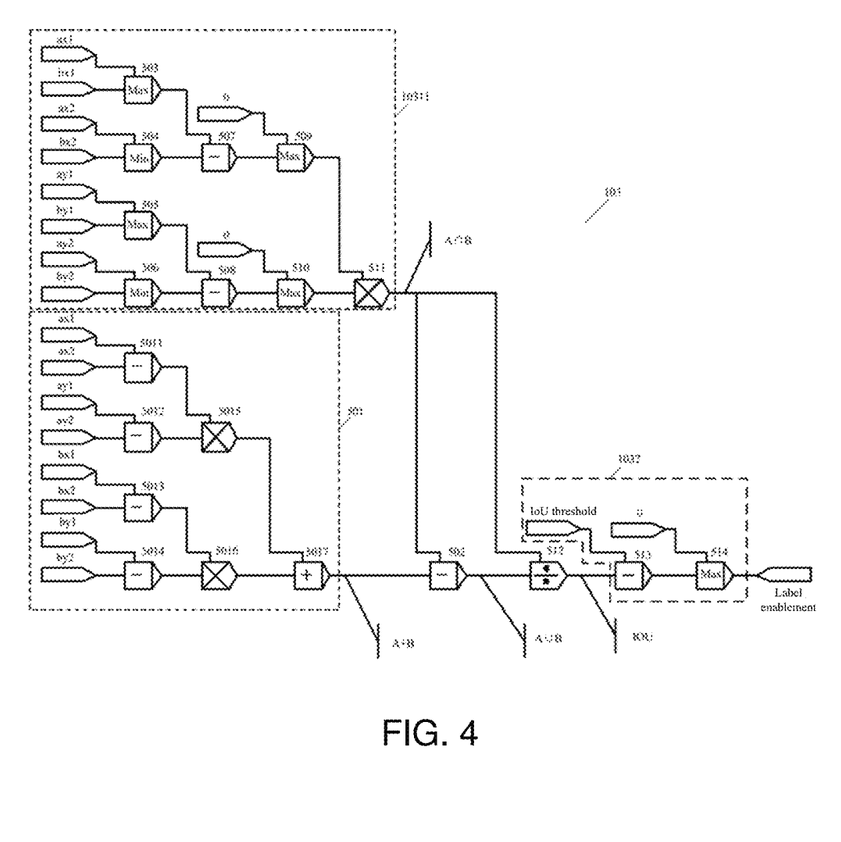
FIG. 4 is a block diagram illustrating a circuit of the operation module in FIG. 1.

FIG. 3 is a block diagram illustrating an exemplary intersection and union of two bounding boxes FIG. 4 is a block diagram illustrating an exemplary circuit of the operation module 103. As a non-limiting exemplary embodiment, referring to FIG. 2 through FIG. 4, the external data includes coordinate information for a first bounding box and the coordinate information for a second bounding box. Here, the first bounding box A receives the highest score so the first bounding box A may be the original bounding box. The coordinate information for the first bounding box A is (ax1, ay1) and (ax2, ay2). The score for the second bounding box B is less than the score for the first bounding box A, so the second bounding box B may be the target bounding box. The coordinate information for the second bounding box B is (bx1, by1) and (bx2, by2).

Referring also to FIG. 4, the union computation unit 10312 may include a sum computation subunit 501 and a first subtraction component 502.

Specifically, the sum computation subunit 501 computes the sum of the first bounding box A and the second bounding box B according to the coordinate information for the first bounding box A and the coordinate information for the second bounding box B.

The first subtraction component 502 subtracts the intersection of the first bounding box A and the second bounding box B from the sum of the first bounding box A and the second bounding box B to obtain the union of the first bounding box A and the second bounding box B.

More specifically, the sum computation subunit 501 includes a second subtraction component 5011, a third subtraction component 5012, a fourth subtraction component 5013, a fifth subtraction component 5014, a first multiplication component 5015, a second multiplication component 5016, and an addition component 5017, compiled as shown in FIG. 4.

In a specific embodiment, the second subtraction component 5011 computes the difference between ax1 and ax2 to obtain a first coordinate difference; the third subtraction component 5012 computes the difference between ay1 and ay2 to obtain a second coordinate difference; and the first multiplication component 5015 computes the product of the first coordinate difference and the second coordinate difference.

The fourth subtraction component 5013 computes the difference between bx1 and bx2 to obtain a third coordinate difference; the fifth subtraction component 5014 computes the difference between by1 and by2 to obtain a fourth coordinate difference; the second multiplication component 5016 computes the product of the third coordinate difference and the fourth coordinate difference; and the addition component 5017 computes the sum of the output results of the first multiplication component 5015 and the second multiplication component 5016.

Further, the computation of the intersection of the first bounding box A and the second bounding box B may be completed on the basis of the intersection computation unit 10311.

Specifically, the intersection computation unit 10311 includes a first maximum value comparison component 503, a first minimum value comparison component 504, a third maximum value comparison component 505, a second minimum value comparison component 506, a sixth subtraction component 507, a seventh subtraction component 508, a second maximum value comparison component 509, a fourth maximum value comparison component 510, and a third multiplication component 511.

More specifically, the first maximum value comparison component 503 determines the maximum value among ax1 and bx1 to be a first horizontal coordinate; and the first minimum value comparison component 504 determines the minimum value among ax2 and bx2 to be a second horizontal coordinate. The sixth subtraction component 507 computes the difference between the first horizontal coordinate and the second horizontal coordinate; and the second maximum value comparison component 509 may determine the maximum value among the output result of the sixth subtraction component 507 and 0.

The third maximum value comparison component 505 determines the maximum value among ay1 and by1 to be a first vertical coordinate; and the second minimum value comparison component 506 determines the minimum value among ay2 and by2 to be a second vertical coordinate. The seventh subtraction component 508 computes the difference between the first vertical coordinate and the second vertical coordinate. The fourth maximum value comparison component 510 determines the maximum value among the output result of the seventh subtraction component 508 and 0. The third multiplication component 511 computes the product of the output results of the second maximum value comparison component 509 and the fourth maximum value comparison component 510 to obtain the intersection of the first bounding box A and the second bounding box B.

Further, the division computation unit 10313 computes the quotient of the intersection and the union of the first bounding box A and the second bounding box B on the basis of a division component 512 to obtain the IoU computation result.

Further, the threshold judgment submodule 1032 includes an eighth subtraction component 513 and a fifth maximum value comparison component 514.

Specifically, the eighth subtraction component 513 computes the difference between the intersection-over-union computation result and the preset threshold value; the fifth maximum value comparison component 514 determines the maximum value among the output result of the eighth subtraction component 513 and 0 to obtain the non-maximum suppression computation result.

As a non-limiting exemplary embodiment, still using external data including coordinate information for two bounding boxes (e.g., a first bounding box A and a second bounding box B) as an example, the score for the first bounding box A is 0.98, and the score for the second bounding box B is 0.75. Performing an IoU computation using a non-maximum suppression operation device 100 provided by this exemplary embodiment of the present disclosure may include the following steps:

First, the external data (i.e., the first bounding box A and the second bounding box B) is sorted from highest to lowest by score. Next, the operation submodule 1031 reads the bounding box with the highest score in the current location, i.e., the coordinate values of the first bounding box A, and takes such bounding box to be the original bounding box; then, the operation submodule 1031 reads the coordinate values of the remaining lower-scoring and unlabeled bounding box (i.e., second bounding box B) and takes such bounding box to be the target bounding box. Then, the operation submodule 1031 computes the intersection-over-union of the first bounding box A and the second bounding box B to obtain an IoU computation result. Finally, a threshold judgment submodule 1032 compares the IoU computation result with a preset threshold value and outputs the IoU computation result.

It should be noted that when the external data includes more than two bounding boxes, the reading is repeated among the remaining lower-scoring and unlabeled bounding boxes, and the subsequent steps are continued and completed in accordance with the computation process above to complete the IoU computation for all bounding boxes and ultimately obtain the IoU computation result of the external data.

Figure 5:
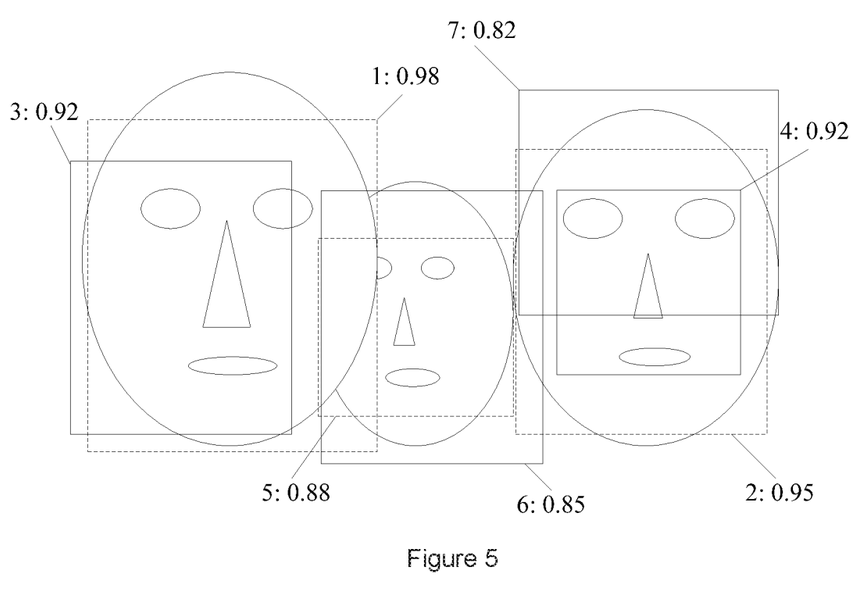
FIG. 5 is a block diagram illustrating a typical application scenario of a non-maximum suppression operation device in an exemplary embodiment of the present disclosure.

As another non-limiting exemplary embodiment, the external data includes coordinate information for a plurality of bounding boxes. FIG. 5 is a block diagram illustrating a typical application scenario of a non-maximum suppression operation device consistent with the present disclosure. Referring to FIG. 5 and Table 1 below, the preset threshold value is set in advance to be 0.5, the external data is numbered from highest to lowest by score, and the process of realizing the labeling of an original bounding box and target bounding boxes implemented on the basis of IoU computation results and the preset threshold value is described in Table 1.

Specifically, first, the original bounding box is determined, i.e., the external data corresponding to No. 1, which has the highest score (0.98). Next, the remaining external data corresponding to the No. 2 through No. 7 are determined to be target bounding boxes. Then, an IoU computation is performed separately on the original bounding box and each target bounding box to obtain the IoU computation results (first traverse in Table 1).

In this exemplary embodiment, an intersection exists between the external data corresponding to No. 3 (scoring 0.92) and the external data corresponding to No. 1 (scoring of 0.98), and their IoU computation result is 0.85, which is greater than the preset threshold value (0.5). The external data corresponding to No. 3 may be labeled "Y" to indicate that it is to be discarded. No intersection exists between the external data corresponding to the remaining numbers and the external data corresponding to No. 1, and their IoU computation results are 0. Therefore, the IoU computation continues to be performed on the external data corresponding to the remaining numbers. That is, when the first IoU computation has completed traversing all the data, the external data corresponding to No. 3 is the labeled data.

Further, the highest-scoring data from the external data corresponding to the remaining numbers is determined to be the original bounding box. This time, the external data corresponding to No. 2 has the highest score (0.95). That is, the external data corresponding to No. 2 is determined to be the new original bounding box, the external data corresponding to the remaining numbers are determined to be new target bounding boxes, and the IoU computation is performed for a second time (second traverse in Table 1).

Table 1 shows that after the IoU computation is completed, the IoU computation results between the external data corresponding to No. 4 and No. 7 and the external data corresponding to No. 2 are 0.8 and 0.7, respectively, both of which are greater than the preset threshold value (0.5). Therefore, the external data corresponding to No. 4 and No. 7 may be labeled "Y" to indicate that it is to be discarded. No intersection exists between the external data corresponding to the remaining numbers and the external data corresponding to No. 2, and their IoU computation results are 0. Therefore, the IoU computation continues to be performed on the external data corresponding to the remaining numbers.

Thus, when the first IoU computation has completed traversing all the data, data corresponding to No. 3. No. 4, and No. 7 are all of the labeled external data.

Further, the process continues in which the highest-scoring data from the external data corresponding to the remaining numbers is determined to be the original bounding box; this time, the external data corresponding to No. 5 has the highest score (0.88). The external data corresponding to No. 5 may be determined to be the new original bounding box, the external data corresponding to the remaining numbers is determined to be the new target bounding boxes, and the IoU computation is performed for a third time (third traverse in Table 1).

Table 1 shows that after the third IoU computation is completed, the IoU computation result between the external data corresponding to No. 6 and the external data corresponding to No. 5 is 0.7, which is greater than the preset threshold value (0.5). Therefore, the external data corresponding to No. 6 may be labeled "Y" to indicate that it is to be discarded.

Thus, after the IoU computation has traversed all the data three times, the external data corresponding to No. 3, No. 4, No. 6, and No. 7 is labeled, and only the external data corresponding to No. 1, No. 2, and No. 5 is kept.

TABLE 1

| No. | Score | First traverse | | Second traverse | | Third traverse | |
|---|---|---|---|---|---|---|---|
| | | IoU | Label | IoU | Label | IoU | Label |
| 1 | 0.98 | | | | | | |
| 2 | 0.95 | 0 | | | | | |
| 3 | 0.92 | 0.85 | Y | | Y | | Y |
| 4 | 0.92 | 0 | | 0.8 | Y | | Y |
| 5 | 0.88 | 0.05 | | 0 | | | |
| 6 | 0.85 | 0.1 | | 0.1 | | 0.7 | Y |
| 7 | 0.82 | 0 | | 0.7 | Y | | Y |

Further, if the data volume of the external data is large and dependency among the external data is almost nonexistent, then, when the IoU computations on external data need to be completed quickly, a plurality of IoU computations may be completed in parallel by means of deploying more operation submodules, thus obtaining higher system computational performance.

As described above, the non-maximum suppression operation device provided by this exemplary embodiment of the present disclosure may rapidly and efficiently complete an NMS computation while minimizing power consumption to the greatest extent to meet the requirements for low-power designs of devices.

An exemplary embodiment of the present disclosure further provides a non-maximum suppression operation system. The non-maximum suppression operation system may include the non-maximum suppression operation device 100 illustrated in the aforementioned FIG. 1 through FIG. 5 and the processor coupled to such device; under the control of the processor, the non-maximum suppression operation device may import the external data, perform an IoU computation on the external data, and compare the IoU computation result with a preset threshold value to obtain an NMS computation result. The processor may be a central processing unit and/or a graphics processing unit.

Further, the non-maximum suppression operation device 100 further exports the non-maximum suppression computation result of the external data to the processor. Please refer to the relevant descriptions associated with FIG. 1 through FIG. 5 for more information on the principles and ways of operation for the non-maximum suppression operation system. Such descriptions will not be repeated here.

In comparison with currently available technology, the technical solution provided by exemplary embodiments of the present disclosure has at least the following benefits:

An exemplary embodiment of the present disclosure provides a non-maximum suppression operation device, the non-maximum suppression operation device including: a data access module configured to import external data or export a non-maximum suppression computation result of the external data; a control module configured to send a control signal for performing computation on the external data; and an operation module configured to perform an intersection-over-union computation on the external data on the basis of the control signal to obtain an intersection-over-union computation result, and to compare the intersection-over-union computation result with a preset threshold value to obtain the non-maximum suppression computation result. A dedicated hardware device for computing non-maximum suppression may be provided by the technical solution provided by the present disclosure. In comparison with existing solutions that employ a common processor (e.g., a central processing unit or a graphics processing unit) to implement a non-maximum suppression computation, an exemplary embodiment of the present disclosure may rapidly and efficiently complete an NMS computation while minimizing power consumption to the greatest extent. That is, when computational capacity is equal, this exemplary embodiment of the present disclosure consumes less power to compute non-maximum suppression; when power consumption is equal, the computational capacity of the dedicated hardware device provided by this exemplary embodiment of the present disclosure is greater.

Further, an exemplary embodiment of the present disclosure further provides a non-maximum suppression operation system, the non-maximum suppression operation system including the aforementioned non-maximum suppression operation device and a processor coupled to such device; under the control of the processor, the non-maximum suppression operation device imports the external data. The exemplary embodiments of the present disclosure may couple the non-maximum suppression operation device with a processor for the purposes of division of work and cooperation, thus saving such processor's resources while at the same time accelerating the non-maximum suppression computation process to allow better performance of the processor.

Notwithstanding the above disclosure, the present disclosure is not limited thereby. Any person having ordinary skill in the art may make various alterations and changes that are not detached from the essence and scope of the present disclosure; therefore, the scope of protection for the present disclosure should be that as defined by the claims.

What is claimed is:

1. A non-maximum suppression operation device, the non-maximum suppression operation device comprises:
    a data access module configured to import external data or export a non-maximum suppression computation result of the external data;
    a control module configured to send a control signal for performing computation on the external data; and
    an operation module configured to perform an intersection-over-union computation on the external data on the basis of the control signal to obtain an intersection-over-union computation result, and to compare the intersection-over-union computation result with a preset threshold value to obtain the non-maximum suppression computation result,
    wherein the operation module comprises:
        an operation submodule configured to perform the intersection-over-union computation on the external data to obtain the intersection-over-union computation result; and
        a threshold judgment submodule configured to compare the intersection-over-union computation result with the preset threshold value to obtain the non-maximum suppression computation result,
    wherein the threshold judgment submodule comprises:
        a first subtraction component configured to compute a difference between the intersection-over-union computation result and the preset threshold value; and
        a first maximum value comparison component configured to determine a maximum value among the output result of the first subtraction component and 0 to obtain the non-maximum suppression computation result.

2. The non-maximum suppression operation device of claim 1, wherein the operation module further comprises:
    an intermediate value buffer submodule configured to cache intermediate value data of the operation submodule during the intersection-over-union computation.

3. The non-maximum suppression operation device of claim 1, wherein the external data comprises coordinate information for a first bounding box and coordinate information for a second bounding box, the intersection-over-union computation on the external data comprises an intersection computation of the first and second bounding boxes, a union computation of the first and second bounding boxes, and a division computation of a result of the intersection computation and a result of the union computation, and the operation submodule comprises:
    an intersection computation unit configured to compute an intersection of the first bounding box and the second bounding box according to the coordinate information for the first bounding box and the second bounding box;
    a union computation unit configured to compute a union of the first bounding box and the second bounding box according to the coordinate information for the first bounding box and the second bounding box; and
    a division computation unit configured to compute a quotient of the intersection and the union to obtain the intersection-over-union computation result.

4. The non-maximum suppression operation device of claim 3, wherein the union computation unit comprises:
    a sum computation subunit configured to compute a sum of the first bounding box and the second bounding box according to the coordinate information for the first bounding box and the second bounding box; and a first subtraction component configured to subtract the intersection of the first bounding box and the second bounding box from the sum of the first bounding box and the second bounding box to obtain the union of the first bounding box and the second bounding box.

5. The non-maximum suppression operation device of claim 4, wherein the coordinate information for the first bounding box is (ax1, ay1) and (ax2, ay2), the coordinate information for the second bounding box is (bx1, by1) and (bx2, by2), and the sum computation subunit comprises:
   a second subtraction component configured to compute a difference between ax1 and ax2 to obtain a first coordinate difference;
   a third subtraction component configured to compute a difference between ay1 and ay2 to obtain a second coordinate difference;
   a first multiplication component configured to compute a product of the first coordinate difference and the second coordinate difference;
   a fourth subtraction component configured to compute a difference between bx1 and bx2 to obtain a third coordinate difference;
   a fifth subtraction component configured to compute a difference between by1 and by2 to obtain a fourth coordinate difference;
   a second multiplication component configured to compute a product of the third coordinate difference and the fourth coordinate difference; and
   an addition component configured to compute a sum of output results of the first multiplication component and the second multiplication component.

6. The non-maximum suppression operation device of claim 3, wherein the coordinate information for the first bounding box is (ax1, ay1) and (ax2, ay2), the coordinate information for the second bounding box is (bx1, by1) and (bx2, by2), and the intersection computation unit comprises:
   a first maximum value comparison component configured to determine a maximum value among ax1 and bx1 to be a first horizontal coordinate;
   a first minimum value comparison component configured to determine a minimum value among ax2 and bx2 to be a second horizontal coordinate;
   a first subtraction component configured to compute a difference between the first horizontal coordinate and the second horizontal coordinate;
   a second maximum value comparison component configured to determine a maximum value among the output result of the first subtraction component and 0;
   a third maximum value comparison component configured to determine a maximum value among ay1 and by1 to be a first vertical coordinate;
   a second minimum value comparison component configured to determine a minimum value among ay2 and by2 to be a second vertical coordinate;
   a second subtraction component configured to compute a difference between the first vertical coordinate and the second vertical coordinate;
   a fourth maximum value comparison component configured to determine a maximum value among the output result of the second subtraction component and 0; and
   a first multiplication component configured to compute a product of output results of the second maximum value comparison component and the fourth maximum value comparison component to obtain the intersection of the first bounding box and the second bounding box.

7. A non-maximum suppression operation system, wherein the non-maximum suppression operation system comprises: the non-maximum suppression operation device of claim 1 and a processor coupled to the non-maximum suppression operation device; wherein under the control of the processor, the non-maximum suppression operation device imports the external data.

8. The non-maximum suppression operation system of claim 7, wherein the non-maximum suppression operation device exports the non-maximum suppression computation result of the external data to the processor.

* * * * *